UNITED STATES PATENT OFFICE 2,292,454

TREATMENT OF SURFACE HALOGENATED RUBBER

Carl M. Langkammerer, Wilmington, Del., assignor to E. I. du Pont de Nemours & Company, Wilmington, Del., a corporation of Delaware No Drawing. Application November 18, 1940,
Serial No. 366,189

10 Claims. (Cl. 117—80)

This invention relates to rubber articles and more specifically to the stabilization of surfaces of rubber articles.

In processing rubber articles, surface treatments with halogens such as chlorine or bromine, or with derivatives of the halogens, such as sulfur chloride or sulfur bromide, have long been used to produce harder and more abrasion-resistant surfaces. When rubber articles whose surfaces have been given such treatments are exposed to actinic radiation, especially light, the surface deteriorates and discolors. This is particularly pronounced in light-colored rubber compounds. When halogen-hardening processes of the type mentioned are used to finish rubber articles they are usually followed by a "sweetening" step which consists in a treatment with basic materials such as ammonia vapors to neutralize any remaining halogen or any free acid which might be formed. The mentioned discoloration occurs, nevertheless, on surfaces which have been neutralized in this manner.

It has been proposed heretofore to stabilize halogenated rubber, e. g., chlorinated rubber, by incorporating in the halogenated rubber certain basic materials such as hexamethylenetetramine, and diphenylguanidine. These agents are ineffective, however, in stabilizing halogen-hardened rubber surfaces.

This invention has as an object a process for improving the durability of rubber which has been surface-hardened with active halogen compounds. Another object is a treatment which improves the resistance of rubber stocks which have been surface-hardened to discoloration upon exposure to actinic light. A further object is the production of improved rubber coated fabrics. Other objects will appear hereinafter.

The above objects are accomplished by treating a halogen-hardened rubber surface with an organic derivative of ammonia in which the nitrogen is attached to at least one monovalent aliphatic group having a chain length of at least eight atoms.

The surface-hardened rubber used in the practice of this invention may be obtained by treating rubber with chlorine, bromine, sulfur chloride, sulfur bromide, or other analogous active halogen compounds. For simplicity, rubber surfaces treated with such compounds are herein termed "halogen-hardened." The rubber surface is usually vulcanized before treatment with the hardening agent, but this procedure is not essential. The present invention is effective, and is in fact desirably applied, to hardened rubber surfaces to which a thin film of a resin, such as shellac, has been applied prior to halogen-hardening in order to moderate the hardening action. The term "halogen-hardened rubber surfaces" is intended to include such resin-coated rubber surfaces which have been halogen-hardened.

In the preferred method of carrying out this invention the long chain aliphatic nitrogen compound of the kind mentioned above is applied as a dilute solution to the halogen-hardened rubber surface and the solvent allowed to evaporate.

The following examples, in which the parts are by weight, further illustrate the practice of the invention.

Example I

A rubberized fabric was prepared by coating cotton sateen with an anchor coat of rubber cement followed by a calender coat of a rubber composition comprising a properly formulated mixture of pale crepe rubber, pigments, fillers, sulfur, accelerators, and antioxidants. The rubber surface of the coated fabric was first given a thin coat of shellac, then embossed, and finally heated to cure and vulcanize the rubber compound. To harden the surface and produce proper slip the rubber was given a surface treatment with solutions of sulfur chloride and bromine and then festooned in a chamber of ammonia vapors. To the thus treated rubberized fabric was applied a 2½% gasoline solution of commercial n-dodecylamine by means of a doctor knife. After removal of the solvent, by slight warming, the thus treated product could not be distinguished visually from untreated material. Upon exposure to carbon arc radiation for 24 hours, a marked discoloration occurred in the product which had not had the n-dodecylamine treatment, whereas discoloration was practically absent in the treated sample. A similar observation was made when the samples were exposed to sunlight behind glass. At the end of a week's such exposure there was a similar marked difference between the treated and untreated samples.

Example II

The rubberized fabric used in this example was made according to the general method described in United States Patent 2,201,931. The rubberized fabric containing a newsprint paper filler was given a thin coat of shellac, embossed, vulcanized, treated with bromine, and finally neutralized with ammonia, as described in the mentioned patent. This rubberized fabric, which was formerly considered completed at this stage, was now given a thin coat of stearamide by means of a doctor knife using a 5% solution of stearamide in chloroform. The product coated with stearamide has a slightly different appearance and a more "leather-like" feel than the original sample. As in the previous example, the product was found to have improved resistance to discoloration on exposure to radiation from a carbon arc and to sunlight behind glass.

*Example III*

A rubberized fabric of the general type described in United States Patent 2,113,718 was given a coat of shellac and then hardened by treatment with bromine. After neutralization a thin coat of the amide of the acid obtained by hydrolyzing hydrogenated castor oil (12-hydroxystearamide) was applied to the surface by spraying with a 2.5% solution of the amide in warm toluene. As in Examples I and II the treated surface was found to discolor less on exposure to sunlight than an untreated one.

*Example IV*

A rubberized fabric similar to that described in Example I and finished by treatment with a combination of sulfur chloride and bromine, after neutralization with ammonia, was treated with N,N-diphenyl-n-dodecylamide in acetone solution. Again the resulting product was more stable toward discoloration on exposure to sunlight than an untreated sample.

The following compounds when applied in a manner similar to that described in the foregoing examples produce a like improvement in the halogen-hardened rubber surfaces:

n-Dodecylamine, n-octadecylamine, stearamide, n-dodecyllauramide, N,N-diphenyl-n-dodecyl lauramide, diethanol lauramide

$(CH_3(CH_2)_{10}CON(CH_2CH_2OH)_2)$, decamethylene dioleamide, ethanol stearamide, allyl amide of undecylenic acid, dimethyl distearoyl hexamethylenediamine, caprylamide, isobutylundecylenamide, N-hydroxymethyl lauramide, 12-hydroxystearamide, morpholamide of lauric acid, N-hexadecyl formamide, and the n-dodecyl ester of omega-N,N-dimethylaminocaproic acid.

The compounds most useful in the practice of this invention are the organic amines and amides in which the monovalent aliphatic group attached to the nitrogen atom has a chain length of at least eight atoms. One of the best compounds for the present purpose is n-dodecylamine. Other agents which are unusually effective are n-octadecylamine, stearamide, and n-dodecyl lauramide.

The stabilizing agents useful for the present purpose are derivatives of ammonia and may be represented by the formula $R.N.X.X_1$, where R is a saturated or unsaturated homoacyclic or heterocyclic radical, i. e. an aliphatic radical, of at least eight atoms in chain length and X and $X_1$ are hydrogen or alkyl, cycloalkyl, aryl, acyl, or heterocyclic radicals. R is preferably homoacyclic and unsubstituted but the presence of substituents on the chain such as short chain alkyl radicals, aryl radicals, hydroxyl, ester, and ether groups, etc., is not precluded. When R is heteroacyclic the atoms interrupting the chain may be oxygen, sulfur, or nitrogen.

The halogen-hardened rubber surfaces treated by the present process may be obtained by agents other than those mentioned, as for instance by stannic chloride and other amphoteric metal halides, or by treatment with a boron halide in combination with an aldehyde.

The organic nitrogen compounds may be applied by several methods such as spraying, brushing, dipping, roller coating or by means of a doctor blade. The materials may be applied as liquids or as melts (in case of solids), but they are most conveniently applied from solution. A variety of solvents can be used including acetone, methyl ethyl ketone, benzene, toluene, gasoline, chloroform, alcohol and the like. It is preferable that the solvent evaporate at a relatively low temperature so that it is unnecessary to heat the rubber to a high temperature to remove the solvent. The use of a low boiling solvent is, however, not essential in the present invention. A very thin coating of the organic nitrogen compound is usually sufficient to give protection against discoloration. Films of thickness less than 0.0001" have been applied and found to function satisfactorily. Generally, however, it is not necessary that the coating of organic nitrogen compound exceed 0.0005" in thickness.

The process of this invention is particularly valuable in the treatment of rubber-coated fabrics. The present process is, however, useful for the treatment of various types of rubber goods, as for example, rubber balls and toys, which are finished by surface-hardening with halogen compounds.

As many apparently widely different embodiments of this invention may be made without departing from the spirit and scope thereof, it is to be understood that I do not limit myself to the specific embodiments thereof except as defined in the appended claims.

I claim:

1. In a process for treating products having a halogen-hardened rubber surface, the step which comprises applying to said surface an organic derivative of ammonia selected from the class consisting of amines and amides in which the nitrogen atom is attached to at least one monovalent aliphatic group having a chain length of at least eight atoms.

2. In a process for treating products having a halogen-hardened rubber surface overlaid with a thin resin film, the step which comprises applying to said surface an organic derivative of ammonia selected from the class consisting of amines and amides in which the nitrogen atom is attached to at least one monovalent aliphatic group having a chain length of at least eight atoms.

3. A process for treating products having a halogen-hardened rubber surface which comprises applying to said surface a solution of an organic derivative of ammonia selected from the class consisting of amines and amides in which the nitrogen atom is attached to at least one monovalent aliphatic group having a chain length of at least eight atoms, and then removing the solvent by evaporation.

4. In a process for making improved rubber coated fabrics, the surface of the rubber coating of which is halogen-hardened, the step which comprises applying to said surface an organic derivative of ammonia selected from the class consisting of amines and amides in which the nitrogen atom is attached to at least one monovalent aliphatic group having a chain length of at least eight atoms.

5. A process for making improved rubber coated fabrics which comprises halogen-hardening the surface of the rubber coating, and then treating the halogen-hardened surface with an organic derivative of ammonia selected from the class consisting of amines and amides in which the nitgoren atom is attached to at least one monovalent aliphatic group having a chain length of at least eight atoms.

6. A process for making improved rubber coated fabrics which comprises applying a thin coat of resin over the rubber coating, treating the resin coated surface with a halogen-hardening agent, and then applying to the treated rubber coating an organic derivative of ammonia selected from the class consisting of amines and amides in which the nitrogen atom is attached to at least one monovalent aliphatic group having a chain length of at least eight atoms.

7. The process set forth in claim 1 in which said organic derivative is an amine having a monovalent aliphatic group having a chain of at least eight atoms attached to the amino nitrogen atom.

8. The process set forth in claim 4 in which said organic derivative of ammonia is n-dodecylamine.

9. The process set forth in claim 4 in which said organic derivative of ammonia is stearamide.

10. The process set forth in claim 4 in which said organic derivative of ammonia is n-octadecylamine.

CARL M. LANGKAMMERER.